Aug. 19, 1930.                L. BUTLER                1,773,446
                            HAY SWEEPING MEANS
                           Filed Sept. 18, 1928
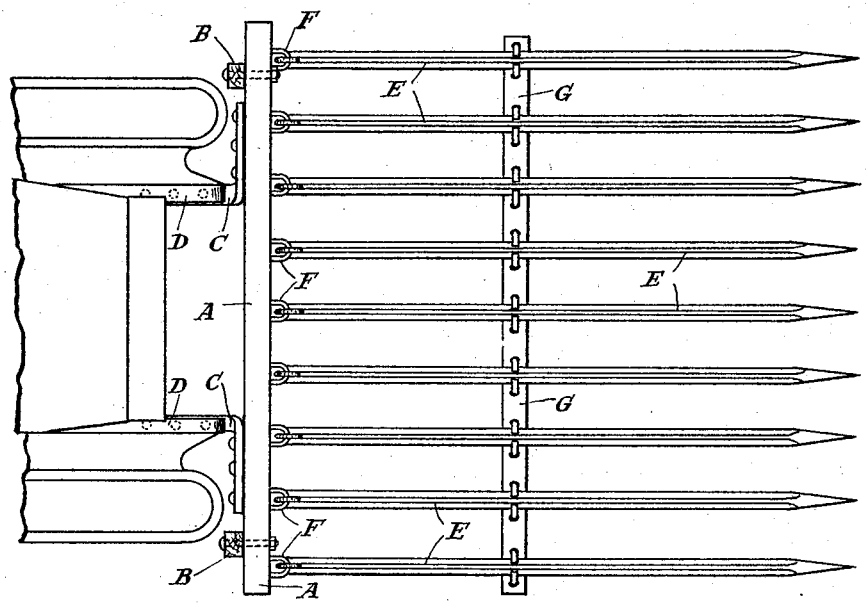
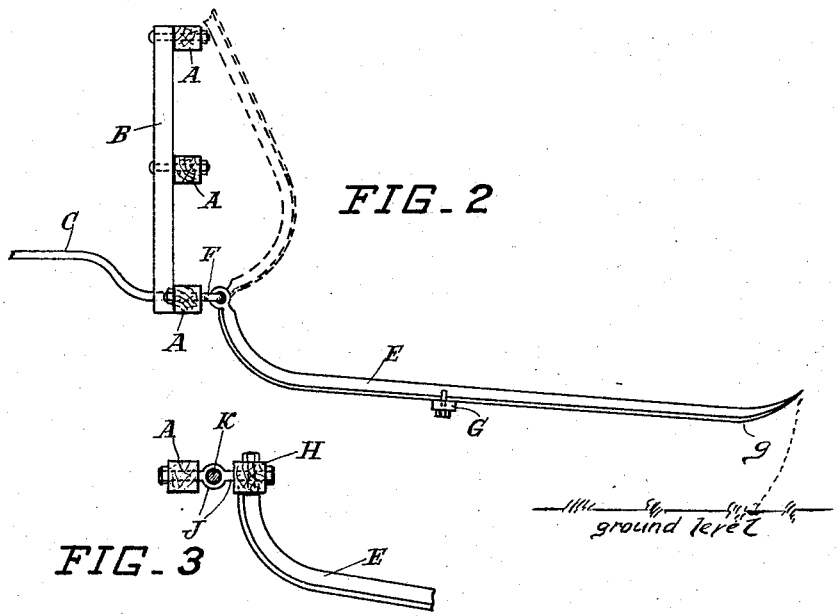
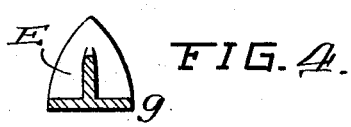

Patented Aug. 19, 1930

1,773,446

UNITED STATES PATENT OFFICE

LOUIS BUTLER, OF INGLEWOOD, NEW ZEALAND

HAY-SWEEPING MEANS

Application filed September 18, 1928, Serial No. 306,646, and in New Zealand January 18, 1928.

This invention has been devised with the object of providing a novel construction of hay sweeping means that are adapted particularly for attachment to the front of a motor propelled vehicle of any kind and particularly to a motor car or lorry. These means are of such a nature as to be readily attached to, or detached from, such vehicle, and are thus adaptable for use in conjunction with a vehicle used for other purposes, and for instance, will allow of a farmer employing his run about car in his hay sweeping operations. They are also of such a nature as to allow of the sweep being raised clear of the ground, and thus to permit of the vehicle being moved from place to place with the sweeper upon it. In its hay sweeping operations, also, it provides for the hay being effectively gathered and conveyed to the place of deposit, and generally for the easy mobility of the sweep in such operations.

The invention consists broadly in the combination with a framing adapted to be secured to extend across the front of the vehicle and which in effect forms the back of the sweep, of a gathering frame consisting in a number of rake or tine members that are arranged to project in parallel lines from the frame and in the longitudinal line of the vehicle, and which frame is so attached to the main, or rear, framing that the said tines may be arranged to extend forwardly at a slight downward incline and thus to act to gather the hay thereon, or may be turned vertically upward to clear the ground.

This construction is shown in the accompanying drawings, in which:—

Figure 1 is a plan of the sweep attached to the front of a motor vehicle.

Figure 2 is a side elevation of the sweep showing its out of action position in dotted lines.

Figure 3 is a detail view of an alternative manner of making and attaching the sweep frame to its rear frame.

Figure 4 is a detail cross sectional view of one of the tines.

In this invention a main, or rear, framing is formed by a number of horizontal bars A connected by cross bars B and this framing is designed to be securely fixed to extend across the front of a motor vehicle so that it is approximately vertical, with the horizontal bars A one above the other. It may, however, be disposed at an incline extending rearwardly, if so desired.

This framing forms the back of the sweep and it is fastened to the vehicle body or chassis by any approved means such as to keep it rigid, as for instance, by means of the brackets C fixed to its bottom member A and bolted to the dumb irons D of the vehicle. This framing A—B may be formed of wood, or metal, as may be desired.

To the bottom bar A are attached a number of rake or tine bars E, each one of which is hinged at its rear end to a staple bolt F so that it may turn in a vertical plane, and is curved downward and then extends forwardly to point at its forward end that is slightly curved upward. These rakes or tines are disposed along the bar A at an approved distance apart, and are made to form a single unit or framing by means of one or more cross bars G to which they are affixed. The whole therefore forms a gathering rake frame that inclines forwardly and downwardly from the vehicle front and bears upon the ground at the point $g$ and rakes and collects upon it hay lying loosely on the ground surface across which it moves when propelled by the travel of the vehicle. This collects upon the rakes, in front of the main frame A—B, and may be deposited at any desired point by merely backing the vehicle, the rakes then sliding from beneath the load.

When not required for hay gathering operations the whole of the raking frame may be swung up and rearward to rest against the main frame, as shown by the dotted lines in Figure 2. In this position, the vehicle may be run about freely to move it to its sphere of action. The whole may be speedily removed from the vehicle by merely unfastening the bracket connections.

In an alternative arrangement instead of each rake bar E being individually hinged to the frame A—B, it may be secured to a common cross bar H (Figure 3) and then such cross bar attached to the frame member A by means of overlapping eye bolts J through which a pivot rod K is passed. The bar H with its rake members may therefore be turned up and down on its pivots.

The said rake bars are made of any approved cross-sectional shape, those shown in the drawings being made of T iron flattened out at its end to form the upwardly turned point.

The pivoting of the rake members to the rear frame ensures that there may be free relative up and down movement of the vehicle and its attachment as they travel over the ground. Any up and down movements of the vehicle upon its springs will not affect the engagement of the rake members with the ground.

I claim:—

1. Hay sweeping means consisting in the combination with a frame adapted to be fixedly attached to the front of a motor vehicle and to extend across such front, of a number of parallel rake bars independently pivotally connected to said frame so that they may extend forwardly with their forward ends resting loosely upon the ground.

2. Hay sweeping means consisting in a main frame formed by horizontal bars and cross members secured thereto and having means whereby said frame may be fixedly attached to the front of a motor vehicle, combined with a gathering frame comprised by a number of rake bars disposed in parallel lines and braced together by a cross bar, and which gathering frame is pivotally attached to the main frame so that its rake bars are arranged to extend forwardly with their forward ends resting loosely upon the ground.

3. Hay sweeping means comprising, in combination, a main frame having means whereby said frame may be secured to and caused to extend across the front of a motor vehicle and to be positioned more or less vertically, and a gathering frame formed by a number of rake bars disposed in parallel lines and braced together by a cross bar, which is pivotally attached to the bottom of said main frame so that it may be turned to cause the said rake bars to project forwardly and downwardly at an incline, or to be turned up and backward against the main frame.

4. Hay sweeping means comprising a rack bar support and rake bars of T shaped cross section, and having an upturned point at the front and a portion at the rear turned up and provided with means for pivotally connecting the rake bars to the rack bar support.

In testimony whereof, I affix my signature.

LOUIS BUTLER.